Jan. 23, 1940.    M. CASTRICUM ET AL    2,188,174
PNEUMATIC TIRE
Filed May 28, 1937    2 Sheets-Sheet 1
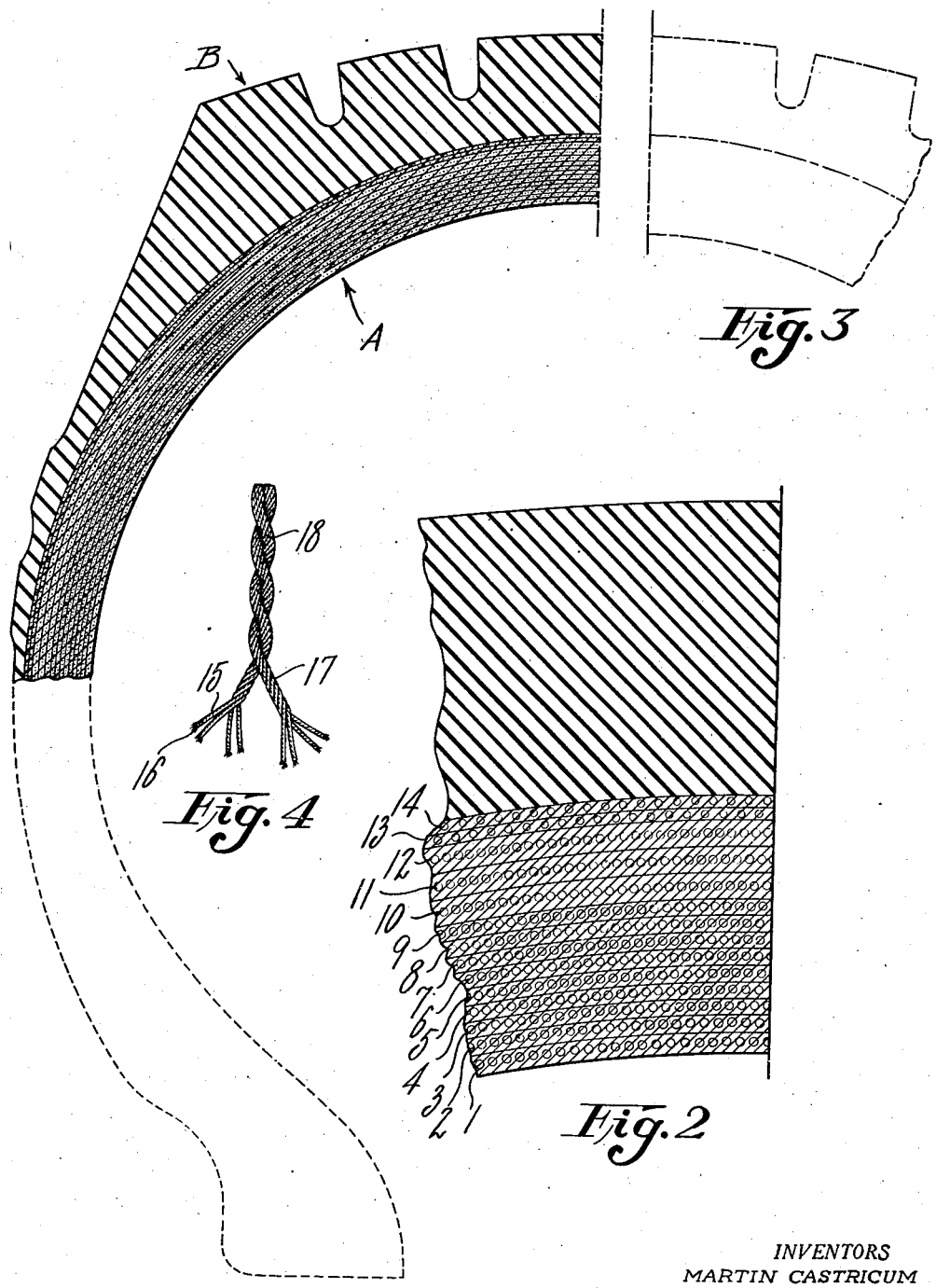
INVENTORS
MARTIN CASTRICUM
FRANCIS C. KENNEDY
BY
ATTORNEYS.

Jan. 23, 1940.   M. CASTRICUM ET AL   2,188,174
PNEUMATIC TIRE
Filed May 28, 1937   2 Sheets-Sheet 2

INVENTORS
MARTIN CASTRICUM
FRANCIS C. KENNEDY
BY
ATTORNEYS

Patented Jan. 23, 1940

2,188,174

UNITED STATES PATENT OFFICE 2,188,174

PNEUMATIC TIRE

Martin Castricum, Grosse Pointe, and Francis C. Kennedy, Detroit, Mich., assignor, by mesne assignments, to United States Rubber Company, New York, N. Y., a corporation of New Jersey Application May 28, 1937, Serial No. 145,226

3 Claims. (Cl. 152—359)

This invention relates to pneumatic tires for motor vehicles, and in particular it relates to the rubberized fabric carcass of such tires and to the cord structure that forms the strain resisting elements thereof. More particularly the invention refers to a pneumatic tire having a relatively thin carcass wherein the strain resisting elements are composed of rayon or other synthetic silk-like materials.

In general, the invention provides for a pneumatic tire, the carcass of which comprises components of relatively reduced gauge arranged and proportioned to withstand the flexing and strain to which a tire is subjected. A cord embodying the principles of our invention is characterized by its greater tensile strength and durability, lower twist, and a somewhat lower elongation than cords of substantially the same unit weight.

In the tire industry the relative proportions of tire carcasses have to a large extent been standardized. That is, similar size tires of different manufactures utilize substantially the same cord gauge, substantially the same thickness of rubber composition layers, and substantially the same total thickness for the carcass.

Due to the flexing of a tire carcass in service, the various plies of the carcass incur a tendency to relative movement. This condition is accentuated as the thickness of the carcass is increased. In such a case the relative movement between plies becomes greater and the degree of heat due to the relative movement of carcass components is increased. Also, the efficiency of the dissipation of heat generated within the carcass is reduced. These conditions are particularly noted in the large size or heavy service type of tires, in which case the temperature of the carcass frequently reaches 300 degrees Fahrenheit while the tire is in operation.

By providing a tire having a thinner carcass, many of the objectionable features due to flexing and heat are overcome. For example, by this invention a pneumatic tire may be manufactured with a substantial reduction in its total weight and in the wall thickness of the carcass, one which generates less heat in service, and dissipates heat more rapidly, and without necessarily lowering the resistance to cord fatigue and/or ply separation so as to impair its capacity for service. Also, such a tire may be manufactured at a cost comparable with a tire embodying conventional cotton cords for its carcass plies.

In the present invention the rayon cords are not only reduced in gauge, but the relative twist in the cord components is reduced substantially to provide a cord having a higher tensile strength based on grams per denier. While a reduction in cord elongation accompanies the increased tensile, such reduction is permssible due to the reduced gauge of the rayon cords and the reduced gauge of the layers of rubber composition encasing the cords. These differences and advantages of the invention may be best described by comparative analysis of conventional practices with a preferred embodiment of the invention such as pointed out in the following detailed description supplemented with drawings, in which:

Fig. 1 is a view in cross section of a portion of a vulcanized pneumatic tire embodying the features of the invention;

Fig. 2 is an enlarged view of a fragment of the tire illustrated in Fig. 1, with the components shown diagrammatically in their relative positions prior to vulcanization thereof;

Fig. 3 is a diagrammatic outline of a portion of a conventional tire incorporating cotton cords and positioned for comparison with the tire of this invention shown in Fig. 1 to illustrate the reduction in wall thickness of the carcass;

Fig. 4 is a diagrammatic view of an elementary cord; and

Figure 5:
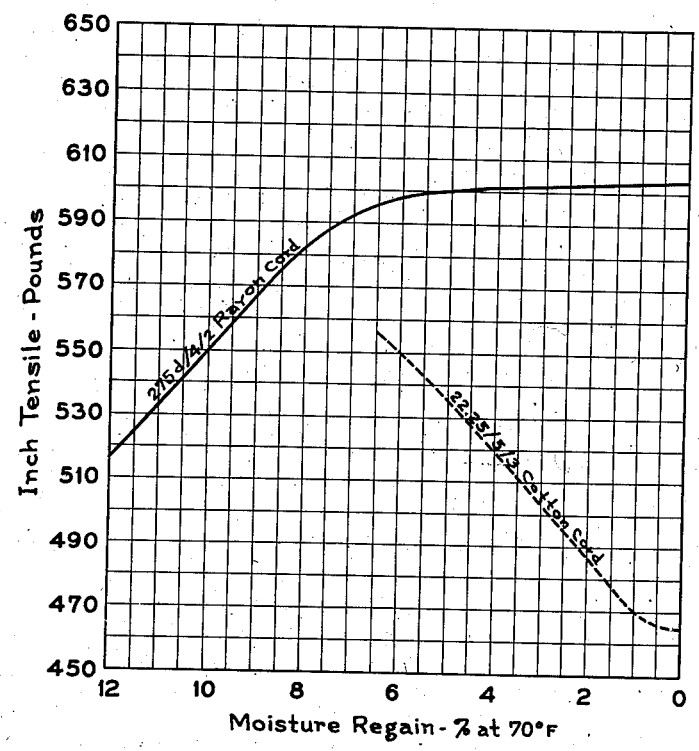
Fig. 5 is a graph showing the tensile strength of rayon and cotton cords at different degrees of moisture regain.

In the manufacture of pneumatic automobile tires it has been the general practice to make up the cords constituting the plies of the carcass of cotton. The gauge of such cotton cords has been in the order of .032 inch. An example of such a cord is the 22.25/5/3 construction wherein the single yarn has a twist of 17.4 turns per inch. The strand formed of five yarns is twisted in the order of 21.5 turns per inch, and the cable formed from three strands is twisted 9.25 turns per inch. The turns per inch as thus given refer to the manufacturing twist or that twist imparted to the cord constituents during the manufacture thereof, as distinguished from the actual number of turns per inch existing in the finished cord.

In accordance with the practice of our invention, the strain resisting elements forming the cords of the fabric plies are composed of a high tenacity rayon or artificial silk of substantially similar characteristics. As a specific example of a cord embodying features of our invention, we refer to a high tenacity rayon cord having a construction such as 275d./4/2. Such a cord represents a considerable reduction in gauge and therefore a substantial departure from conventional practices. This cord is further characterized by having a twist in the cord and its components substantially lower than that which prevails in ordinary cord constructions. As a result of the low twist, two important characteristics of the cord are effected. One is the desirable condition of high tensile strength. The other condition is the low stretch or elongation which ordinarily is disadvantageous; but in the practice of the present invention this reduction in elongation is permissible.

Generally, the more turns per inch in the strand and cable results in a lower tensile strength but a greater resistance to fatigue. On the other hand, the less turns per inch in the strand and cable, the greater is the tensile strength, but resistance to fatigue is lower. In order to overcome the objection of a lower resistance to fatigue due to low twist, the invention provides a tire of rayon or artificial silk, the carcass of which has a thickness substantially less than that of conventional tires. This is attained by reducing the gauge of the cord, increasing the number of cords per inch in the fabric, and reducing the various layers of rubber composition which encase the cords.

With reference to the drawings, and in particular to Figs. 1 and 2, a large size or heavy service tire is shown as a specific embodiment of the invention. The tire is of standard size, being 9.75—20, 12-ply, forming a carcass A and a tread B. The tread B may be of any suitable wear resisting rubber composition, and its road contacting surface may include a configuration to provide any desired traction or antiskid characteristics.

As shown particularly in Fig. 2, the carcass A comprises rubber and fabric plies indicated by the numerals 1 to 12, inclusive. The two outermost plies 13 and 14 correspond more closely to the conventional breaker strips than to the body plies in the carcass. This general type of cotton tire is described in Patent No. 2,006,315, issued June 25, 1935.

Before the rayon cords are grouped and rubberized to form the carcass plies, the cords are initially treated with an adhesive composition for insuring a proper bond between the rayon cord and the rubber composition to be applied in a subsequent operation. Thereafter various coatings or layers of rubber are applied to the cords. These layers of rubber composition vary in accordance with the position of the particular ply in the carcass. For example, it is customary to provide a heavier coating gauge of rubber composition to the first or band ply. Also, the outer plies, such as plies 10, 11, and 12, have additional layers of rubber so that the total gauge of the rubber layer of the outer plies will be greater than that of the principal or body plies. The various layers of rubber composition applied to the cords are generally referred to as skimcoat, recoat, or double recoat. For the purpose of the present invention, these differences in the various coatings or layers of rubber composition have no particular function, and therefore reference to the gauge of the various plies will relate to the total thickness of the ply which includes the cords and the various layers of rubber composition applied thereto.

The dimensions of the various plies in reference to the spacing of the cords refer to the constituents in their condition before assembly into a tire. For this reason, certain factors of distortion and compression for converting the undistorted conditions of the materials to the different conditions they occupy in the finished, vulcanized tire have been omitted. This method of considering the conditions of the materials before they are incorporated into the tire is general practice, and conversion factors for considering the same materials in the finished tire are well understood in the art.

The rayon cord exemplified in the present embodiment is of 275d./4/2 construction, and is shown particularly in Fig. 4. The single yarn 15 is of a size 275 denier, and is formed from about 120 filaments 16 of high tenacity rayon, and has a tensile strength equivalent to 3 grams per denier tested under atmospheric conditions of 70 degrees Fahrenheit and 60 percent relative humidity, by a machine for applying a load at a rate of 12 grams per denier per minute. Four of the yarns 15 are twisted together to form a strand 17, and two of the strands are twisted together to form the cable or finished cord 18. In the following table the principal construction features of the improved cord are illustrated comparatively with a conventional cotton cord:

|  | Cord | Gauge | Yards per pound | Manufacturing twist | | |
| --- | --- | --- | --- | --- | --- | --- |
|  |  |  |  | Yarn | Strand | Cable |
| Cotton | 22.25/5/3 | .032 | 1025 | 17.4 R. H. | 21.5 R. H. | 9.25 L. H. |
| Rayon | 275d./4/2 | .023 | 1873 | 7.1 L. H. | 18.2 R. H. | 10.7 L. H. |

From this comparative illustration it is noted that the improved cord indicates a substantial reduction in cord gauge and a corresponding increase in yards per pound of cord. The manufacturing twists of the strand and cable do not show very great differences. However, it is standard practice to maintain substantially the same number of turns per inch in relation to the cord gauge. If the turns per inch of the improved cord were computed on this basis, the relative twists of the strand and cable would be 29.1 and 12.5 turns per inch, respectively. From this consideration it is apparent that the strand and cable twists are relatively low, the result of which is an increase in tensile strength in grams per denier as hereinafter particularly pointed out.

Due to the reduction in gauge of the rayon cord a greater number of cords per inch may be arranged to form the fabric. In large size pneumatic tires it is sometimes advantageous to vary to some extent the number of ends per inch in the several plies. For example, in the 12-ply tire illustrated, plies 1 to 10, inclusive, contain 39.7 cords per inch, the outer plies 11 and 12 contain 30.0 cords per inch, and the breaker plies 13 and 14 contain 20.0 cords per inch. This differential of spacing in the different plies is a variable practice within the discretion of the manufacturer. However, for purposes of comparison, the tire of the present embodiment is, in general, relatively proportioned in respect to the cotton cord tire. As the body plies 1 to 12, inclusive, represent the principal constituents of the carcass, further consideration of plies is intended to refer to such plies unless accompanied by a statement to the contrary.

In the following tabulation the tensile strength per inch of cords is indicated:

|  | Cord | Tensile | Cords per inch | Tensile per ply inch |
|---|---|---|---|---|
| Cotton | 22.25/5/3 | 21.0# | 26.5 | 556.5# |
| Rayon | 275d./4/2 | 13.0# | 39.7 | 516.1# |

Apparently the cotton cord indicates a higher tensile strength per inch of cords than the improved rayon cord, but as these tensiles are based on standard testing methods they are subject to be qualified by the variability of moisture conditions inherent within the cords in the operating range of the tire in service. Rayon and cotton have different hygroscopic characteristics. For example, under standard conditions of temperature and humidity, cotton cords are computed on the basis of 6½ percent moisture regain, while rayon is based on a 12 percent moisture regain condition. Under bone dry conditions the tensile strength per inch of cords of the 22.25/5/3 cotton cord lowers to 464.7 pounds. On the other hand, the 275d./4/2 rayon cord, bone dry, increased in tensile per inch of cords to 603.8 pounds.

The advantage of the improved rayon cord is readily obvious by referring to the chart shown as Fig. 5 in the drawings. While it is very difficult to determine with accuracy the moisture content in the cords within the operating range of a tire, it is generally recognized in the industry that the moisture regain of cotton cords in a tire is substantially less than 6½ percent, lying somewhere between 6 percent and zero or bone dry. Similarly, the moisture regain of rayon cords in a tire is definitely below 12 percent and is considered to lie between 10 percent and bone dry. With these ranges in mind it is obvious from the chart that the tensile strength per inch of the improved cord is at least equal to or greater than the tensile of conventional cotton cords.

Having established that a tire embodying the improved rayon cord is equal to or stronger than the conventional cotton cord tire, the advantages of the improved rayon cord in respect to carcass thickness and total carcass weight can be shown. As the gauge of .023 inch of the 275d./4/2 rayon cord represents a substantial reduction compared with the gauge of .032 inch of conventional 22.25/5/3 cotton cord, so also does the invention propose within its scope the reduction of the ply gauge which includes the cords and the layers of rubber composition within which the cords are embedded. It has been considered general practice to apply a standard gauge of rubber composition layer to tire cords regardless of differences in the gauges of the cords. In the present embodiment the gauge of the layers of rubber composition relative to cord gauge is reduced in substantially the same ratio as the relative difference between the gauge of the conventional cotton cord and its encasing layers of rubber composition. An example of these comparative differences of the gauge of the various plies is as follows:

|  | Cord | Gauge 1st ply | Gauge— 2nd to 9th ply | Gauge 10th to 12th ply | Total carcass thickness |
|---|---|---|---|---|---|
| Cotton | 22.25/5/3 | .082 | .067 | .104 | .930 |
| Rayon | 275d./4/2 | .056 | .046 | .072 | .640 |

The total carcass thickness of the 275d./4/2 construction, as indicated, represents a substantial reduction as compared with the conventional cotton cord. In the tire industry, even a slight decrease in carcass thickness, while maintaining at least the same carcass strength, is considered of outstanding importance as it permits greater flexibility of the carcass, less relative movement of cords and less generation of heat within the carcass. Improvements in these conditions result in the attainment of improved tire performance due to lower fatigue and increased freedom from ply separation. When it is considered that the improved tire represents a comparative reduction in carcass thickness of about 31 percent, its advantages become more readily apparent. Additional advantages are also obtained due to a reduction in the weight of the tire. Actual comparisons in weight differences between a cotton 22.25/5/3 construction and a rayon 275d./4/2 construction in a 9.75—20, 12-ply tire show that the 275d./4/2 construction represents a reduction of about eighteen pounds. This is an economical factor not only as a manufacturing advantage, including shipping, but also as a direct benefit to the vehicle equipped with such tires, due in part to a reduction in the kinetic energy of the revolving tire.

In tire manufacture it is found necessary to maintain a reasonable range of permissible elongation in the cord in order to withstand tire fatigue and broken fabric resulting therefrom. The proper degree of cord elongation can best be determined by comparative tire testing. A tire made up of 22.25/5/3 cord is illustrative of conventional tires of similar size. Assuming that the conventional tire is equivalent to a rating of 100 percent, actual comparative tests have indicated improvements in the tire of our embodiment as follows:

|  | Cord | Spot break | Broken fabric | Separation | Rupture |
|---|---|---|---|---|---|
|  |  | Percent | Percent | Percent | Percent |
| Cotton | 22.25/5/3 | 100 | 100 | 100 | 100 |
| Rayon | 275d./4/2 | 490 | 117 | 164 | 100 |

From these comparative tests it is apparent that the improved tire shows definite advantages relative to carcass performance. An improvement in tread wear has also been attained. However, it is difficult to explain the reason for this improvement because of the many factors which are involved when changes are made in the tire carcass. It can only be assumed that this improvement results from the better proportioned or balanced carcass.

As an illustrative embodiment of our invention we have shown a 275d./4/2 rayon cord. The invention, however, is not restricted to this particular cord as other constructions and variations of twists are also applicable.

A 275d./5/3 rayon cord has a gauge of .032 inch, being comparable in this respect to the conventional cotton cord of .032 inch. A cord of this construction does not have the advantages of the improved cord as herein described. For example, the layers of rubber composition which encase the cords could not be reduced. It may be possible to gain some advantage by decreasing the number of carcass plies or by spacing the cords further apart. Such practices do not provide an adequate degree of improvement and do not result in a carcass of the desired thinness and flexibility. The gauge of the cord is, therefore, a principal factor in the invention, and other cords within such range are contemplated within the scope of the invention. An example of another rayon cord and some of its characteristics is as follows:

| Cord | Gauge | Yards per pound | Tensile | Manufacturing twist | | |
|---|---|---|---|---|---|---|
| | | | | Yarn | Strand | Cable |
| 275d./5/2 | .026 | 1,450 | 15.0 | 7.2 L. H. | 18.4 R. H. | 10.7 L. H. |

A 9.75—20, 12-ply tire embodying a 275d./5/2 cord when made up into rubberized carcass fabric has a total carcass thickness, less the breaker plies, of .738 inch, as compared with .930 inch representing the thickness of a similar tire embodying 22.25/5/3 cotton cords. This represents a substantial reduction in carcass thickness in the order of 20.6 percent.

While the features of the 275d./5/2 cord are applicable to the invention, it is obvious that various other arrangements of yarns and strands may be assembled to form a combination within the scope of the invention, and that the weight of the yarn may be decreased, permitting an increase in the number of yarns and/or strands.

In the manufacture of tire cords the twist in the strand and cable has a definite relation with tensile strength of the cord and its percent elongation. It is generally understood in the art that the greater the twist in the strand and cable, the greater is the cord elongation.

In tire performance, in so far as it relates to fabric fatigue, rupture and the like, cord elongation is an important factor. As previously pointed out, it is permissible to utilize a cord having a substantial reduction in elongation only when the cord is reduced in gauge so as to permit of a relatively thin tire carcass. In order to provide a carcass of substantially decreased thickness, it is necessary to increase the relative tensile strength of the cords by providing proper twist in the strand and cable which are relatively low. A substantial increase in tensile strength is obtained, while at the same time providing a reduction in percent elongation of the cord, such reduction being permissible in view of the decrease in total carcass thickness. By providing a cord with a relatively low twist, an increase in tensile strength in grams per denier is obtained. The following table shows the 275d./4/2 and 275d./5/2 cords of our invention in comparison with substantially similar cords having higher twists in the strand and cable:

275d./5/2 cord represents 74 percent of the tensile strength of the yarn in grams per denier.

In computing the tensile strength of the various cords as herein described, it is to be understood that such testing shall be in accordance with present preferred methods of testing. The rayon yarns and cords and cotton cords are tested under an atmospheric condition of 70 degrees Fahrenheit and 60 percent relative humidity. The yarn is tested on a machine of suitable capacity operating at a constant specimen rate of a load of 12 grams per denier per minute. The characteristics of the rayon cords are determined on a Scott pendulum type testing machine of 50 pounds load capacity, the lower jaw of which moves at a rate of 12 inches per minute. Cords are tested on machines having cam clamp type jaws spaced to provide a distance of 10 inches between nips. Care should be taken that no twist is lost in preparing the specimen, either by the cord constituents untwisting or by the twist running back into the cord below the lower clamp before the nip is set. It is to be understood that all computations of the denier of rayon cord constituents are based on conditions of 12 percent moisture regain.

While we have shown and described a certain preferred embodiment of our invention in the form of a large size heavy service tire, it is to be understood that features of the invention are applicable to other size tires, including passenger car tires, and that it is obvious that certain changes or modifications may be made in specific detail of construction which we contemplate in the scope of our invention as defined in the appended claims.

Having thus described our invention, what we claim and desire to protect by Letters Patent is:

1. In a pneumatic tire, a carcass embodying a plurality of plies of twisted artificial silk strain resisting elements, and strata of vulcanized rubber composition intermediate and bonded to the plies of strain resisting elements, said strain resisting elements each being of a gauge less than .024 inch and having a tensile strength of at least 2.21 grams per denier and being composed of a plurality of filaments twisted and then plied together, the individual twists being of the

| Cord | Gauge | Manufacturing twist | | | Tensile in grams per denier |
|---|---|---|---|---|---|
| | | Yarn | Strand | Cable | |
| 275d./4/2 | .024 | 7.3 L. H. | 26.0 R. H. | 13.6 L. H. | 1.95 |
| 275d./4/2 | .023 | 7.1 L. H. | 18.2 R. H. | 10.7 L. H. | 2.49 |
| 275d./5/2 | .027 | 7.3 L. H. | 23.1 R. H. | 12.1 L. H. | 1.88 |
| 275d./5/2 | .026 | 7.2 L. H. | 18.4 R. H. | 10.7 L. H. | 2.22 |

It is noted that the cords of our invention having the lower twist show a substantial increase in tensile strength in grams per denier. As hereinbefore pointed out, the yarn tensile is equivalent to 3 grams per denier. On this basis the tensile strength in grams per denier of the 275d./4/2 cord, due to the particular twisting combination of cord constituents, represents 83 percent of the tensile strength of yarn in grams per denier. By a similar comparison, the order of 7, 18, and 10 turns per inch, and the number of strain resisting elements forming the principal plies being at least 32 per inch.

2. In a pneumatic tire, a carcass embodying a plurality of plies of twisted artificial silk strain resisting elements, and strata of vulcanized rubber composition intermediate and bonded to the plies of strain resisting elements, said strain resisting elements each being of a gauge of less than .027 inch and having a tensile strength of at least 2.21 grams per denier, and being composed of a plurality of filaments twisted and then plied together, the individual twists being of the order of 7, 18, and 10 turns per inch, and the number of strain resisting elements forming the principal plies being at least 32 per inch.

3. In a pneumatic tire, a carcass embodying a plurality of plies of twisted artificial silk strain resisting elements, and strata of vulcanized rubber composition intermediate and bonded to the plies of strain resisting elements with the total average thickness of each principal ply of elements and covering rubber before vulcanization being not over .046 inch, said strain resisting elements each being of a gauge less than .024 inch and having a tensile strength of at least 2.21 grams per denier, and being composed of a plurality of filaments twisted and then plied together, the individual twists being of the order of 7, 18, and 10 turns per inch, and the number of strain resisting elements forming said principal plies being at least 32 per inch.

MARTIN CASTRICUM.
FRANCIS C. KENNEDY.